(12) United States Patent
Suzuki

(10) Patent No.: US 11,687,303 B2
(45) Date of Patent: Jun. 27, 2023

(54) IMAGE FORMING SYSTEM WITH POST-PROCESSING SECTION THAT RECEIVES COMMANDS

(71) Applicant: FUJIFILM BUSINESS INNOVATION CORP., Tokyo (JP)

(72) Inventor: Koichi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 382 days.

(21) Appl. No.: 16/875,362

(22) Filed: May 15, 2020

(65) Prior Publication Data

US 2021/0117141 A1    Apr. 22, 2021

(30) Foreign Application Priority Data

Oct. 17, 2019  (JP) ................. 2019-190561

(51) Int. Cl.
*G06F 3/12*    (2006.01)
(52) U.S. Cl.
CPC .......... *G06F 3/1264* (2013.01); *G06F 3/1257* (2013.01)
(58) Field of Classification Search
None
See application file for complete search history.

(56) References Cited

U.S. PATENT DOCUMENTS

2013/0272741 A1*  10/2013  Morita .............. G03G 15/6538
                                                              399/82
2019/0052763 A1*  2/2019  Kayama ............. H04N 1/00689

FOREIGN PATENT DOCUMENTS

JP          3093321 B2   10/2000
JP       2007-305143 A   11/2007

* cited by examiner

*Primary Examiner* — Andrew H Lam
(74) *Attorney, Agent, or Firm* — Oliff PLC

(57) ABSTRACT

An image forming system includes: an image forming apparatus that includes an image forming section that forms an image on a recording material in accordance with a print job and a first reception section that receives a command about output of the print job; and a post-processing apparatus that includes a post-processing section that performs post-processing on the recording material transported from the image forming apparatus in accordance with the print job and a second reception section that receives a command about the post-processing and that receives a command about re-output of the print job in a case where the print job is to be possibly re-output.

9 Claims, 7 Drawing Sheets

COPY

| IMAGE QUALITY TEXT/PHOTOGRAPH (PRINTED PHOTOGRAPH) | GROUND COLOR REMOVAL YES | BIND NO |
| --- | --- | --- |
| COPY DENSITY/SHARPNESS/SATURATION DENSITY: NORMAL SHARPNESS: NORMAL SATURATION: NORMAL | PAPER FOLD NO | AUTOMATIC ROTATION NO |
| STAMP NO | COLOR-SPECIFIC DENSITY ADJUSTMENT YES | |

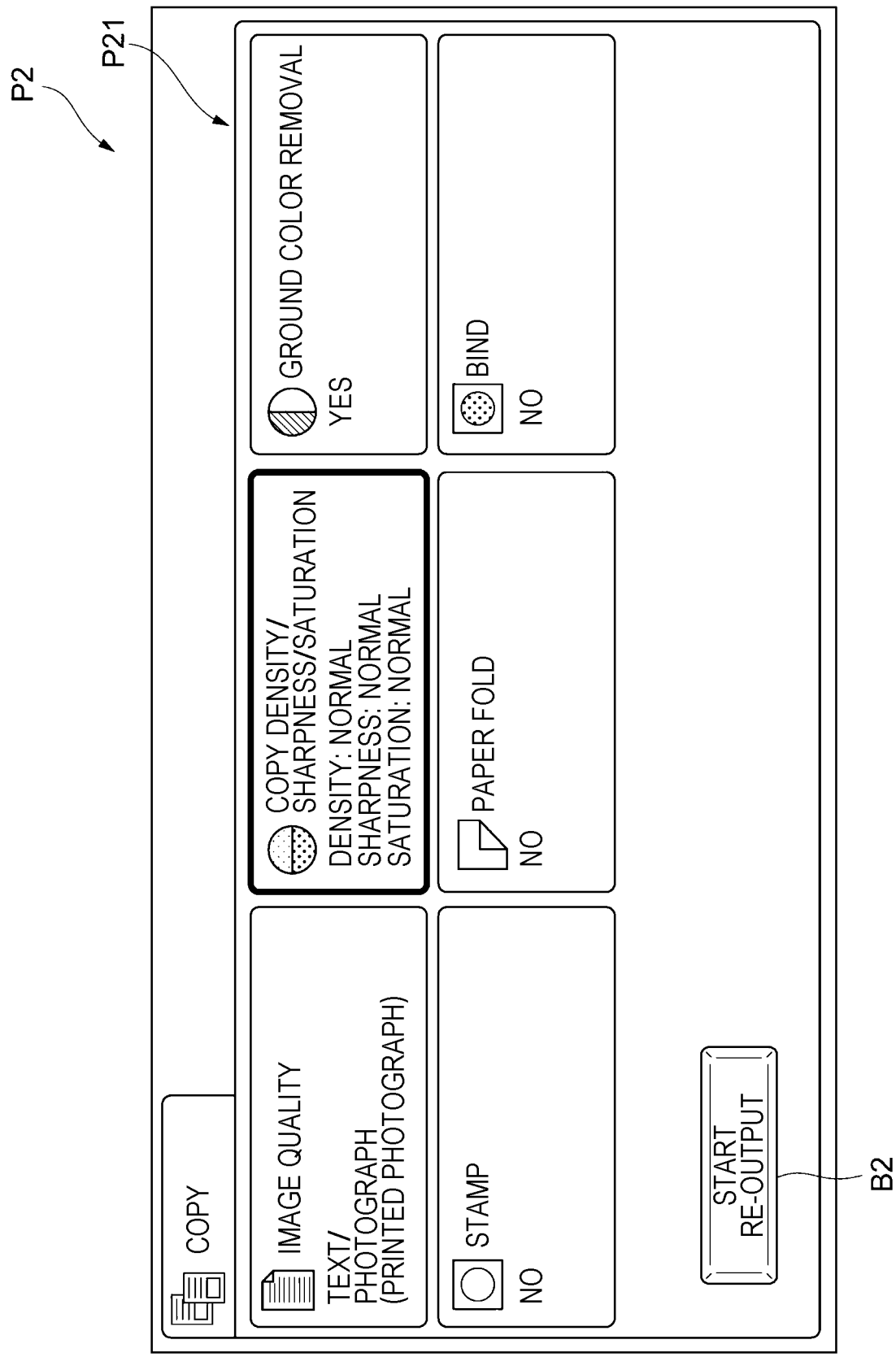

IMAGE FORMING SYSTEM WITH POST-PROCESSING SECTION THAT RECEIVES COMMANDS

CROSS-REFERENCE TO RELATED APPLICATIONS

This application is based on and claims priority under 35 USC 119 from Japanese Patent Application No. 2019-190561 filed Oct. 17, 2019.

BACKGROUND

(i) Technical Field

The present disclosure relates to an image forming system.

(ii) Related Art

Japanese Unexamined Patent Application Publication No. 2007-305143 discloses, as a related art, a technique that allows a device, which has a first operation panel and which is functionally extendable through connection to an external device, to be operable for the entire device including the extended functions using a second operation panel provided to the external device, and to be operable also from the first operation panel, separately from the operation for the entire device through the second operation panel.

Meanwhile, Japanese Patent No. 3093321 discloses, as a related art, an image forming apparatus constituted from a plurality of devices that have respective operation sections, the image forming apparatus enabling the operation sections to be individually set to be effective/ineffective and enabling the devices to communicate the set state and the operation content of the respective operation sections among each other.

SUMMARY

Aspects of non-limiting embodiments of the present disclosure relate to providing an image forming system that includes an image forming apparatus and a post-processing device and that improves the operability for a user to provide a command about re-output of a print job compared to a case where such a command is received by only the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system including: an image forming apparatus that includes an image forming section that forms an image on a recording material in accordance with a print job and a first reception section that receives a command about output of the print job; and a post-processing apparatus that includes a post-processing section that performs post-processing on the recording material transported from the image forming apparatus in accordance with the print job and a second reception section that receives a command about the post-processing and that receives a command about re-output of the print job in a case where the print job is to be possibly re-output.

BRIEF DESCRIPTION OF THE DRAWINGS

An exemplary embodiment of the present disclosure will be described in detail based on the following figures, wherein:

FIG. 3 illustrates an example of a setting input screen to be displayed on a first operation panel by a display controller;

FIG. 5 illustrates an example of a setting change screen to be displayed on the second operation panel by the display controller;

DETAILED DESCRIPTION

An exemplary embodiment of the present disclosure will be described below with reference to the accompanying drawings.

<Configuration of Image Forming System>

Figure 1:
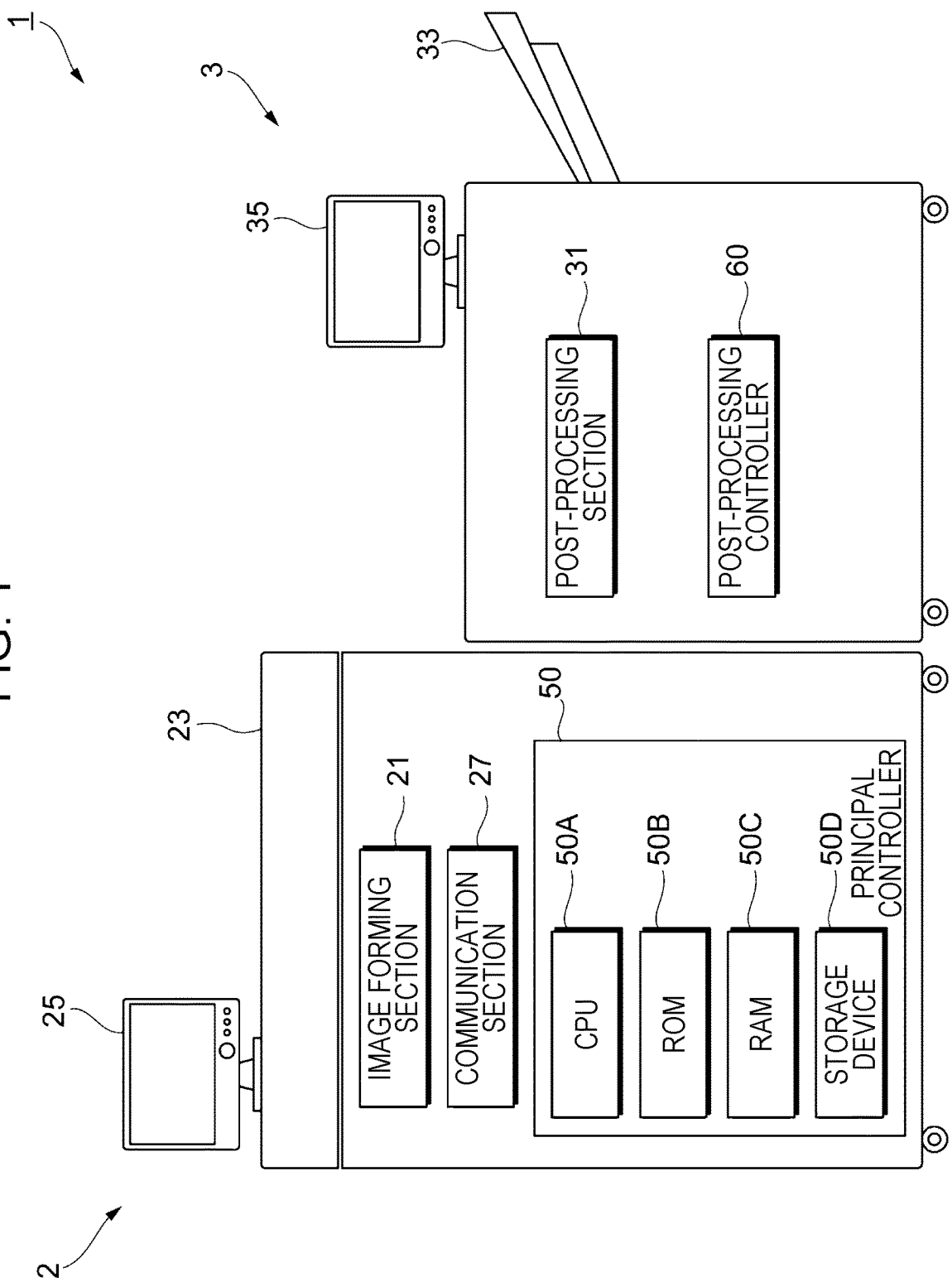
FIG. 1 illustrates the overall configuration of an image forming system according to an exemplary embodiment.

FIG. 1 illustrates the overall configuration of an image forming system 1 according to the present exemplary embodiment.

The image forming system 1 illustrated in FIG. 1 includes an image forming apparatus 2 that forms an image on paper as an example of a recording material using an electrophotographic system, for example, and a post-processing apparatus 3 that performs post-processing on the paper on which an image has been formed by the image forming apparatus 2. In the image forming system 1 according to the present exemplary embodiment, the image forming apparatus 2 and the post-processing apparatus 3 are disposed side by side in the horizontal direction.

The image forming apparatus 2 includes: an image forming section 21 that forms an image on paper; an image reading section 23 that reads an image formed on a document; a first operation panel 25 that displays various types of information and that receives operation input from a user; a communication section 27 that communicates with an external device such as a personal computer (PC); and a principal controller 50 that controls the various sections of the image forming apparatus 2 and the post-processing apparatus 3 and that controls the entire image forming system 1.

The image forming section 21 forms an image that matches a print job on paper using an electrophotographic system etc., for example.

The image reading section 23, which is an example of an acquisition section that acquires image data, includes a scanner device that reads a document and that generates image data that represent an image of the read document, and outputs the generated image data to the principal controller 50.

The first operation panel 25, which is an example of a first reception section, has a function of displaying information and a function of receiving an input operation performed by the user. The first operation panel 25 is constituted as a liquid crystal touch screen display, for example, and displays information about the image forming apparatus 2, for example, on the basis of control performed by the principal controller 50. The first operation panel 25 also displays a display screen for receiving an operation from the user, and receives an input operation from the user via the display screen. As discussed in detail later, the first operation panel 25 receives a command about output of a print job through an input operation from the user.

The principal controller 50 is composed of a central processing unit (CPU) 50A, a read only memory (ROM) 50B, and a random access memory (RAM) 50C.

The ROM 50B stores a control program to be executed by the CPU 50A. The CPU 50A reads the control program stored in the ROM 50B, and executes the control program using the RAM 50C as a work area. When the control program is executed by the CPU 50A, the various sections of the image forming apparatus 2 and the post-processing apparatus 3 and the entire image forming system 1 are controlled. Consequently, an image is formed on paper by the image forming section 21, and a set document is read by the image reading section 23, for example. In addition, a predetermined screen is displayed on the first operation panel 25.

The principal controller 50 further includes, as an example of a storage section, a storage device 50D that is constituted as a hard disk device, a semiconductor memory, etc. and that stores image data generated by the image reading section 23, image data acquired via the communication section 27, etc. The storage device 50D may be used to store the control program to be executed by the CPU 50A as necessary.

The control program executed by the CPU 50A may be provided as recorded in a computer-readable storage medium such as a magnetic recording medium (such as a magnetic tape and a magnetic disk, for example), an optical recording medium (such as an optical disc, for example), a magneto-optical recording medium, and a semiconductor memory. Alternatively, the control program may be downloaded using a communication medium such as the Internet.

The post-processing apparatus 3 includes: a post-processing section 31 that performs post-processing on the paper transported from the image forming apparatus 2; an ejection section 33 to which the paper which has been subjected to the post-processing performed by the post-processing section 31 is ejected; a second operation panel 35 that displays various types of information and that receives operation input from the user; and a post-processing controller 60 that controls the various sections of the post-processing apparatus 3 on the basis of control performed by the principal controller 50 of the image forming apparatus 2.

The post-processing section 31 performs post-processing that matches a print job on the paper transported from the image forming apparatus 2. The post-processing section 31 includes a post-processing mechanism such as a folding mechanism that performs a folding process such as inward tri-fold (C-fold) and outward tri-fold (Z-fold) on paper, a punching mechanism that performs a punching process on paper, and a binding mechanism that performs a binding process on a plurality of sheets of paper. The post-processing section 31 may include a plurality of post-processing mechanisms that perform different types of post-processing on paper, or may include a single post-processing mechanism.

The paper which has been subjected to the post-processing performed by the post-processing section 31 is ejected to the ejection section 33 to be stacked thereon. In the present exemplary embodiment, the ejection section 33 is provided at a position away in the horizontal direction from the first operation panel 25 of the image forming apparatus 2.

As with the first operation panel 25, the second operation panel 35, which is an example of a second reception section, has a function of displaying information and a function of receiving an input operation performed by the user. The second operation panel 35 is constituted as a liquid crystal touch screen display, for example, and displays information about the post-processing apparatus 3, for example, on the basis of control performed by the principal controller 50 and the post-processing controller 60. The second operation panel 35 also displays a display screen for receiving an operation from the user, and receives an input operation from the user via the display screen. As discussed in detail later, the second operation panel 35 receives, through an input operation from the user, a command about the post-processing performed by the post-processing section 31, and receives a command (hereinafter occasionally referred to as a "re-output command") about re-output of a print job in the case where the print job is to be possibly re-output.

As with the principal controller 50, the post-processing controller 60 includes a CPU, a ROM, and a RAM, although not illustrated. When the control program is executed by the CPU, the various sections of the post-processing apparatus 3 are controlled. Consequently, post-processing is performed on the paper by the post-processing section 31, for example. In addition, the post-processing controller 60 is configured to be communicable with the principal controller 50 of the image forming apparatus 2 via a wire or wirelessly.

Subsequently, an overview of a process performed in the image forming system 1 to execute a print job and output a resulting product will be described.

The print job is a unit of a sequence of image forming processes and post-processing performed on paper in the image forming system 1. When a print job is executed, paper etc. which has been subjected to image forming processes and post-processing is output as a resulting product. In the description of the present exemplary embodiment, executing a print job and outputting a resulting product is occasionally referred to simply as "outputting a print job". In the description of the present exemplary embodiment, in addition, "performing post-processing" includes the post-processing section 31 of the post-processing apparatus 3 performing post-processing on paper and thereafter ejecting the paper to the ejection section 33, and transporting paper to the post-processing section 31 and thereafter transporting the paper to the ejection section 33 without the post-processing section 31 performing post-processing.

In the image forming system 1 according to the present exemplary embodiment, the principal controller 50 receives an output command for a print job from the first operation panel 25 of the image forming apparatus 2 or a PC etc. connected via the communication section 27.

For example, in the image forming system 1, a display controller 53, to be discussed later, of the principal controller 50 causes the first operation panel 25 of the image forming apparatus 2 to display a select screen for receiving selection of the type of a print job and a setting input screen P1 (see FIG. 3 to be discussed later) which is a display screen for receiving an output command for a print job. The user provides an output command for a print job by inputting information about the type of the print job, information about the image forming processes, information about the post-processing, information about image reading, information about security setting, etc. via the select screen or the setting input screen P1 displayed on the first operation panel 25. In the following description, the information about the image forming processes is occasionally referred to as "image formation information", the information about the post-processing is occasionally referred to as "post-processing information", and the information about image reading is occasionally referred to as "image reading information".

Examples of the type of a print job include: a print job (hereinafter referred to as "simple copy") for forming an image on paper on the basis of image data acquired via the image reading section 23; a print job (hereinafter referred to as "accumulated copy") for forming images on paper after accumulating image data acquired via the image reading section 23 in the storage device 50D; a print job (hereinafter referred to as "simple print") for forming an image on paper on the basis of image data acquired from a PC etc. via the communication section 27; a print job (hereinafter referred to as "accumulated print") for forming images on paper after accumulating image data acquired from a PC etc. via a communication section in the storage device 50D; a print job (hereinafter referred to as "multiple transmission") for outputting image data to a plurality of output destinations; a print job (hereinafter referred to as "sample copy") for forming, on paper, a sample image for adjusting various conditions for the image formation information using a part of image data; a print job (hereinafter referred to as "test copy") for forming an image on paper using a part of image data (e.g. image data for the first page) for test print; etc. In each print job, the image forming section 21 of the image forming apparatus 2 performs the processes described above on the basis of the image formation information, thereafter the paper is transported to the post-processing apparatus 3, and the post-processing section 31 performs the post-processing on the basis of the post-processing information. The type of a print job is not limited thereto.

The image formation information is information about various conditions set for the image forming processes performed by the image forming section 21. While examples of the image formation information include color mode (such as full-color printing and monochrome printing, for example), image quality, density, sharpness, contrast, ground color removal, stamp, type of paper (such as paper size and basis weight, for example), number of copies to be output, and pages to be output, the image formation information is not specifically limited thereto.

In the case where the type of the print job is multiple transmission in which image data are output to a plurality of output destinations, in addition, the image formation information includes information about the output destinations, information about the output format for each of the output destinations, etc. While examples of the output destinations for multiple transmission include output to the ejection section 33 of the post-processing apparatus 3, saving of the image data in the storage device 50D (so-called box saving), output of the image data to a PC, output to a different image forming apparatus (so-called remote printing), and facsimile transmission, the output destinations are not limited thereto.

The post-processing information is information about various conditions set for the post-processing performed by the post-processing section 31. While examples of the post-processing information include the type of the post-processing (such as folding process, punching process, and binding process), the position at which the post-processing is performed, and the number of sheets of paper to be subjected to the post-processing, the post-processing information is not specifically limited thereto.

The image reading information is information about various conditions set for a process of the image reading section 23 reading a document and acquiring image data. While examples of the image reading information include information about automatic rotation (a process of rotating the read image data in accordance with output paper) and information about color-specific density adjustment (a process of determining the colors of a document and individually changing the reading density for each of the colors), the image reading information is not specifically limited thereto.

Examples of the information about security setting include information as to whether or not re-output of a print job is permitted, information as to whether or not user authentication is required in the case where re-output of a print job is permitted, and information such as a password which is used for authentication in the case where user authentication is required. The user authentication is a process of checking whether or not a user has the right to execute re-output of a print job in the case where the user provides a re-output command for the print job.

When an output command for a print job is received, the principal controller 50 acquires information about the type of the print job, the image formation information, the post-processing information, etc., and stores such information in the storage device 50D. In addition, the principal controller 50 acquires image data from the image reading section 23 or a PC etc. connected to the communication section 27 in accordance with the type of the print job. The principal controller 50 also stores the acquired image data in the storage device 50D in accordance with the type of the print job.

Next, the principal controller 50 controls the image forming section 21 on the basis of the image formation information and the image data which have been acquired, forms an image on paper, and transports the paper to the post-processing apparatus 3.

The principal controller 50 also outputs the acquired post-processing information to the post-processing controller 60 of the post-processing apparatus 3. In the post-processing apparatus 3, the post-processing controller 60 controls the post-processing section 31 on the basis of the post-processing information acquired from the principal controller 50 so as to perform post-processing on the paper transported from the image forming apparatus 2. In the image forming system 1, the post-processing controller 60 may directly acquire the post-processing information via operation input to the second operation panel 35.

After that, the paper on which an image has been formed in the image forming apparatus 2 and which has been subjected to the post-processing in the post-processing apparatus 3 is ejected to the ejection section 33 of the post-processing apparatus 3. Consequently, the print job is completed.

The user who uses the image forming system 1 occasionally executes a print job again after completing the print job and checking the paper as the resulting product ejected to the ejection section 33. In the following description, executing an already executed print job again and outputting a resulting product, more specifically performing the image forming processes and the post-processing again for a print job that has already been subjected to the image forming processes and the post-processing without acquiring the image data again and outputting a resulting product, is referred to as "re-output of a print job". The content of the image forming processes and the post-processing for the first execution of a print job and the content of the image forming processes and the post-processing for re-output of the print job may be different from each other.

In the image forming system 1, as discussed above, the first operation panel 25 of the image forming apparatus 2 and the ejection section 33 of the post-processing apparatus 3 are provided at positions away in the horizontal direction from each other. Therefore, if a re-output command for a print job is received on the first operation panel 25 of the image forming apparatus 2, it is necessary for the user to move from the ejection section 33 of the post-processing apparatus 3 to the first operation panel 25 of the image forming apparatus 2 in order to provide a re-output command for a print job after checking paper ejected to the ejection section 33. In this case, the operability for re-output of a print job tends to be lowered.

In the present exemplary embodiment, on the contrary, a re-output command for a print job may be received on the second operation panel 35 of the post-processing apparatus 3 in the case where the print job is to be possibly re-output. The present exemplary embodiment will be described in detail below.

Figure 2:
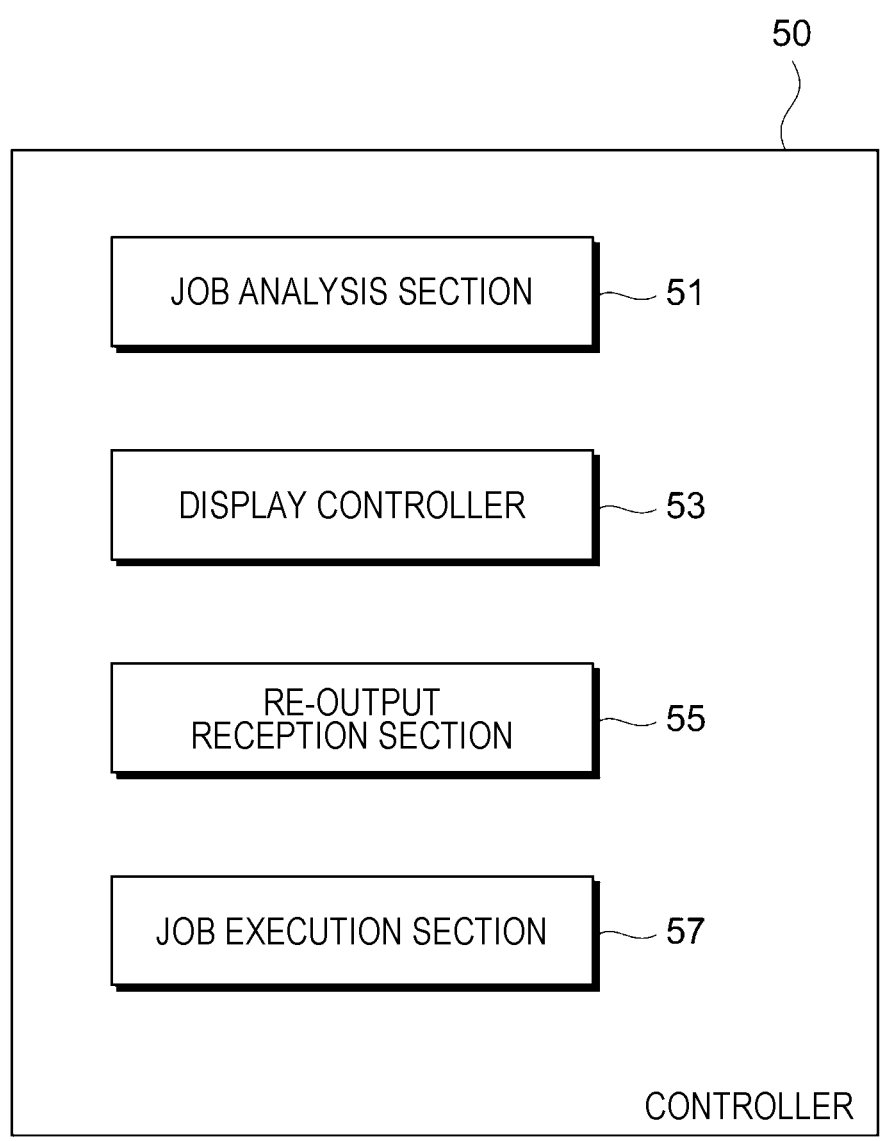
FIG. 2 illustrates the software configuration of a principal controller according to the exemplary embodiment.

FIG. 2 illustrates the software configuration of the principal controller 50 according to the present exemplary embodiment. Incidentally, FIG. 2 illustrates the software configuration of the principal controller 50 about the function of the second operation panel 35 of the post-processing apparatus 3 to receive a re-output command for a print job in the case where the print job is to be possibly re-output.

The principal controller 50 includes: a job analysis section 51 that analyzes a print job for which an output command has been received; the display controller 53 that controls display on the second operation panel 35 on the basis of the result of an analysis by the job analysis section 51; a re-output reception section 55 that receives a re-output command for a print job on the basis of operation input to the second operation panel 35; and a job execution section 57 that re-outputs a print job by controlling the image forming section 21 and the post-processing section 31 of the post-processing apparatus 3 on the basis of a re-output command.

The job analysis section 51 acquires information about the type of a print job and image formation information in the case where an output command for the print job is received on the basis of an operation etc. on the first operation panel 25. The job analysis section 51 determines, on the basis of the information about the type of the print job and the image formation information, whether or not the print job for which an output command has been received corresponds to a print job to be possibly re-output. The print job to be possibly re-output will be described in detail in later paragraphs.

In the case where the print job is to be possibly re-output, in addition, the job analysis section 51 determines, on the basis of the information about security setting, whether or not re-output of the print job is permitted, and determines, in the case where such re-output is permitted, whether or not the print job requires user authentication.

The job analysis section 51 outputs the analysis result to the display controller 53.

The display controller 53 controls display on the first operation panel 25 and the second operation panel 35.

The display controller 53 causes the first operation panel 25 to display a select screen for receiving selection of the type of a print job as a display screen for receiving an output command for a print job. When the type of a print job is selected on the select screen, the display controller 53 causes the first operation panel 25 to display, as the display screen for receiving an output command for a print job, the setting input screen P1 that allows input of setting of the image formation information, the post-processing information, and the image reading information related to the print job.

FIG. 3 illustrates an example of the setting input screen P1 to be displayed on the first operation panel 25 by the display controller 53. FIG. 3 illustrates the setting input screen P1 to be displayed on the first operation panel 25 in the case where the simple copy discussed above is selected as the type of a print job on the select screen for a print job.

On the setting input screen P1, input of the image formation information, the post-processing information, and the image reading information is received as a command about output of a print job.

Specifically, the setting input screen P1 illustrated in FIG. 3 allows input of setting of image quality, copy density/sharpness/saturation, ground color removal, and stamp as the image formation information. The setting input screen P1 illustrated in FIG. 3 also allows input of setting about paper folding and binding as the post-processing information. The setting input screen P1 illustrated in FIG. 3 further allows input of setting about color-specific density adjustment and automatic rotation as the image reading information.

In addition, the display controller 53 causes the second operation panel 35 to display an add/change button B1, which is an operation section for displaying a setting change screen P2, to be discussed later, in the case where the job analysis section 51 determines that the print job is to be possibly re-output and that re-output of the print job is permitted.

When the add/change button B1 is operated by the user, the display controller 53 causes the second operation panel 35 to display the setting change screen P2 which is a display screen for receiving a command about re-output of a print job.

Figure 4A:
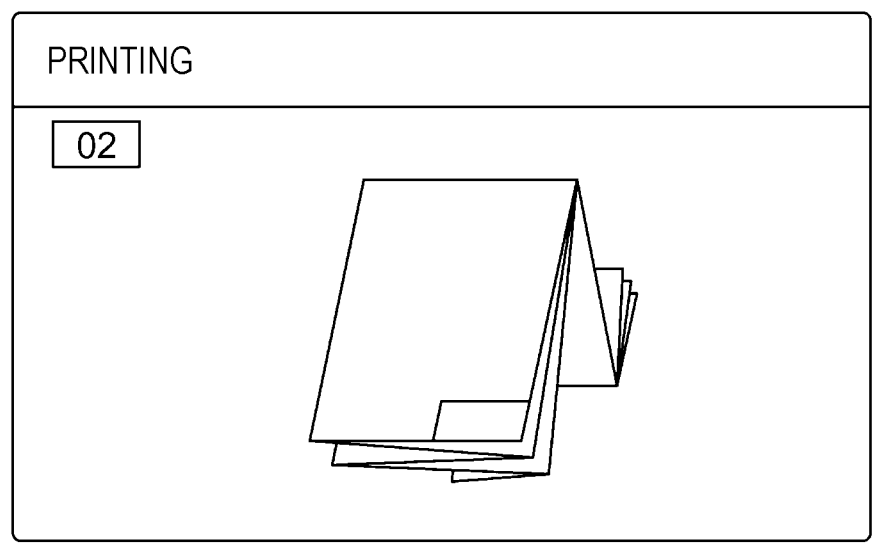
FIGS. 4A and 4B illustrate an add/change button to be displayed on a second operation panel by the display controller.
Figure 4B:
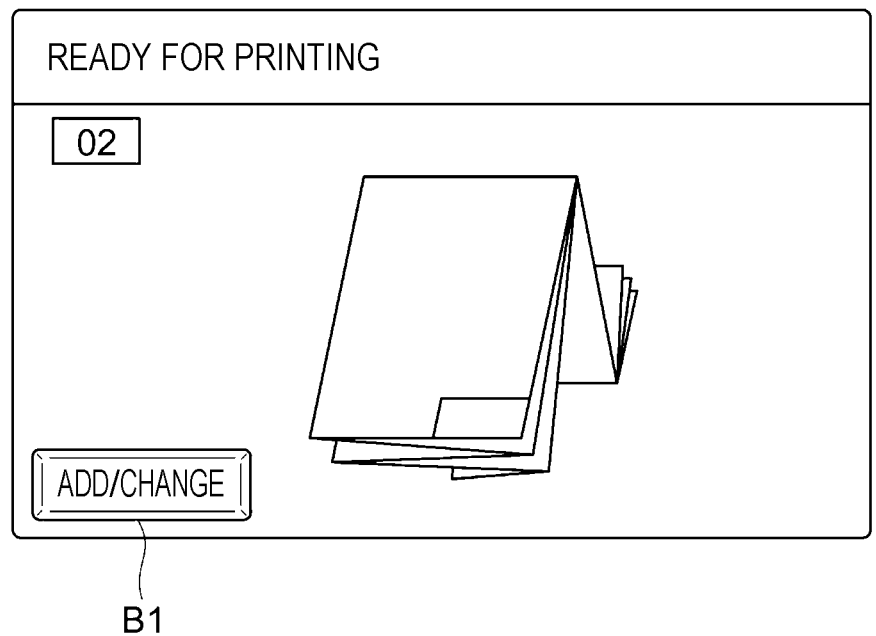

FIGS. 4A and 4B illustrate the add/change button B1 to be displayed on the second operation panel 35 by the display controller 53. FIG. 4A illustrates a display screen to be displayed on the second operation panel 35 before a print job for which an output command has been provided using the setting input screen P1 is completed. Meanwhile, FIG. 4B illustrates a display screen to be displayed on the second operation panel 35 after a print job is completed in the case where the print job is to be possibly re-output and re-output of the print job is permitted.

As illustrated in FIGS. 4A and 4B, the add/change button B1 is not displayed during execution of a print job, and the add/change button B1 is displayed to be operable by the user when a print job is completed.

FIG. 5 illustrates an example of the setting change screen P2 to be displayed on the second operation panel 35 by the display controller 53. As illustrated in FIG. 5, the setting change screen P2 includes an information input section P21 that receives input of the image formation information and the post-processing information as a command about re-output of a print job, and a re-output command button B2 for determining the image formation information and the post-processing information which has been input.

The information input section P21 of the setting change screen P2 receives, as a command about re-output of a print job, a part of a command about output of a print job received by the first operation panel 25 through the setting input screen P1. Incidentally, the information input section P21 of the setting change screen P2 receives input of the image formation information and the post-processing information as a command for the image data already acquired via the image reading section 23 etc. On the other hand, the information input section P21 of the setting change screen P2 does not receive input of the image reading information received through the setting input screen P1 displayed on the first operation panel 25 as a command for image data required to be acquired again.

Specifically, the information input section P21 of the setting change screen P2 illustrated in FIG. 5 allows input of setting of image quality, copy density/sharpness/saturation, ground color removal, and stamp as the image formation information. The information input section P21 of the setting change screen P2 illustrated in FIG. 5 also allows input of setting about paper folding and binding as the post-processing information.

On the other hand, the information input section P21 of the setting change screen P2 illustrated in FIG. 5 does not allow input of setting about color-specific density adjustment and automatic rotation as the image reading information.

In the case where input of the image reading information is enabled on the setting change screen P2 displayed on the second operation panel 35, it is occasionally necessary to acquire image data again by the image reading section 23 performing image reading work when various conditions for the image reading information are changed.

Thus, configuring the setting change screen P2 not to receive input of the image reading information makes it unnecessary to move to the image reading section 23 of the image forming apparatus 1 in order to acquire image data again in the case where the print job is to be re-output on the basis of an operation on the second operation panel 35.

Further, the display controller 53 causes the second operation panel 35 to display an authentication screen for receiving input of information such as a password which is used for user authentication in the case where it is determined by the job analysis section 51 that user authentication is required to re-output a print job.

The display controller 53 may cause the second operation panel 35 to display a display screen by directly controlling the second operation panel 35, or may cause the second operation panel 35 to display a display screen by controlling the second operation panel 35 via the post-processing controller 60 of the post-processing apparatus 3.

Furthermore, the display controller 53 may control display on the first operation panel 25 in the case where the add/change button B1 or the setting change screen P2 is displayed on the second operation panel 35. For example, the display controller 53 may restrict operation input to the display screen by the user so that a re-output command for a print job may not be received on the first operation panel 25.

The display controller 53 may also control display on the first operation panel 25 in the case where a re-output command for a print job is received on the setting change screen P2 of the second operation panel 35. For example, the display controller 53 may cause the first operation panel 25 to display a display screen indicating that re-output of a print job is being executed in the case where re-output of a print job is started in response to an operation on the setting change screen P2 of the second operation panel 35.

Returning to FIG. 2, the re-output reception section 55 acquires the image formation information and the post-processing information input to the information input section P21 of the setting change screen P2 in the case where the re-output command button B2 on the setting change screen P2 displayed on the second operation panel 35 is operated. The conditions for the image formation information and the post-processing information related to the print job stored in the storage device 50D are updated on the basis of the image formation information and the post-processing information which has been newly acquired, and output to the job execution section 57.

The job execution section 57 controls execution of a print job, for which a re-output command has been provided, on the basis of the image formation information and the post-processing information which has been updated by the re-output reception section 55. That is, the job execution section 57 controls the image forming section 21 on the basis of the updated image formation information and the image data stored in the storage device 50D so as to form an image on paper. In addition, the job execution section 57 controls the post-processing section 31 on the basis of the updated post-processing information so as to perform post-processing on the paper transported from the image forming apparatus 2.

Figure 6:
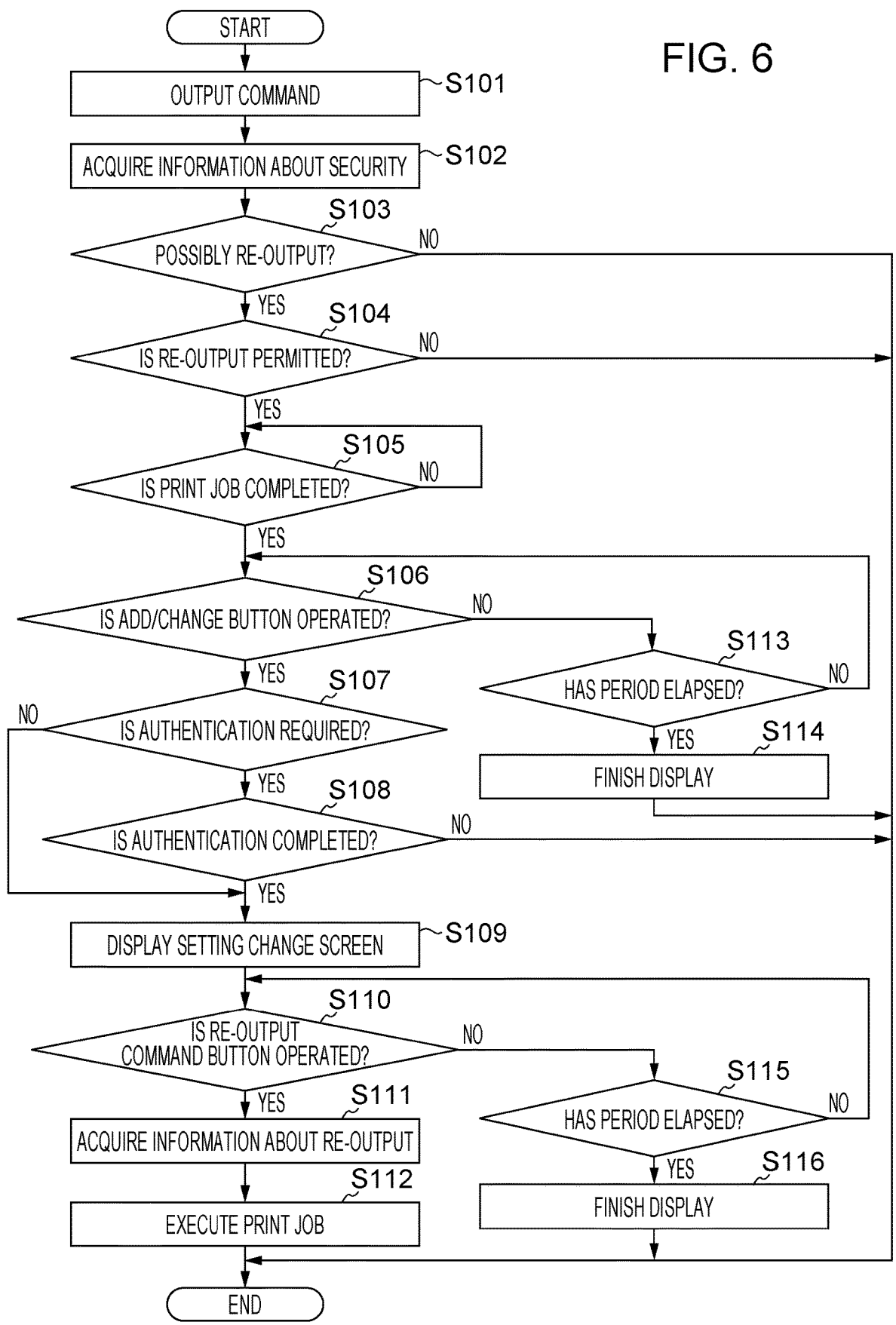
FIG. 6 is a flowchart illustrating an example of the flow of a process performed by the principal controller.

Subsequently, the flow of a process of receiving re-output of a print job on the second operation panel 35 of the post-processing apparatus 3 in the case where the print job is to be possibly re-output will be described. FIG. 6 is a flowchart illustrating an example of the flow of a process performed by the principal controller 50.

When the principal controller 50 receives an output command for a print job via operation input etc. to the setting input screen P1 (see FIG. 3) of the first operation panel 25 (step S101), the job analysis section 51 acquires information about the type of the print job, the image formation information, and information about security setting included in the output command for a print job (step S102).

The job analysis section 51 determines, on the basis of the information about the type of the print job and the image formation information, whether or not the print job for which an output command has been received in step S101 corresponds to a print job to be possibly re-output (step S103).

In the case where the print job does not correspond to a print job to be possibly re-output (NO in step S103), the principal controller 50 ends the sequence of processes.

In the case where the print job corresponds to a print job to be possibly re-output (YES in step S103), on the other hand, the job analysis section 51 determines, on the basis of the information about security setting, whether or not re-output of the print job is permitted (step S104).

In the case where re-output of the print job is not permitted (NO in step S104), the principal controller 50 ends the sequence of processes.

In the case where re-output of the print job is permitted (YES in step S104), on the other hand, the principal controller 50 determines whether or not the print job for which an output command has been received in step S101 is completed (step S105).

In the case where the print job is not completed (NO in step S105), the principal controller 50 continues the process in step S105 until the print job is completed.

In the case where the print job is completed (YES in step S105), on the other hand, the display controller 53 of the principal controller 50 causes the second operation panel 35 to display the add/change button B1. As discussed above, the add/change button B1 is an operation section that is operable by the user to cause the second operation panel 35 to display the setting change screen P2.

The display controller 53 of the principal controller 50 determines whether or not the add/change button B1 is operated on the second operation panel 35 (step S106).

When the add/change button B1 is operated by the user (YES in step S106), the principal controller 50 determines, on the basis of the information about security setting, whether or not re-output of the print job requires user authentication (step S107).

In the case where re-output of the print job does not require user authentication (NO in step S107), the principal controller 50 proceeds to step S109, to be discussed later, to continue the process.

In the case where re-output of the print job requires user authentication (YES in step S107), the principal controller 50 performs a user authentication process (step S108). Although not described in detail, the display controller 53 of the principal controller 50 causes the second operation panel 35 to display an authentication screen for receiving input of information such as a password which is used for user authentication. The principal controller 50 performs user authentication by collating the password etc. input to the authentication screen by the user with information stored in the storage device 50D in advance. The user authentication method is not specifically limited.

In the case where user authentication may not be performed (NO in step S108), the principal controller 50 ends the sequence of processes.

In the case where user authentication is completed (YES in step S108), on the other hand, the display controller 53 causes the second operation panel 35 to display the setting change screen P2 (step S109). As discussed above, the setting change screen P2 is a screen for receiving input of the image formation information and the post-processing information as a command about re-output of a print job.

Next, the display controller 53 of the principal controller 50 determines whether or not the re-output command button B2 on the setting change screen P2 is operated (step S110).

Next, when the re-output command button B2 on the second operation panel 35 is operated by the user (YES in step S110), the re-output reception section 55 acquires information about re-output of the print job (step S111). Specifically, the re-output reception section 55 acquires various conditions for the image formation information and the post-processing information input to the information input section P21 of the setting change screen P2, and updates the image formation information and the post-processing information on the print job stored in the storage device 50D on the basis of the acquired conditions.

Next, the job execution section 57 of the principal controller 50 executes the print job again on the basis of the image formation information and the post-processing information which has been updated (step S112). That is, the job execution section 57 controls the image forming section 21 on the basis of the updated image formation information so as to form an image on paper. In addition, the job execution section 57 controls the post-processing section 31 on the basis of the updated post-processing information so as to perform post-processing on the paper transported from the image forming apparatus 2. The job execution section 57 may control the post-processing section 31 directly, or may control the post-processing section 31 via the post-processing controller 60 of the post-processing apparatus 3.

The sequence of processes of receiving re-output of a print job is ended in the manner described above.

In the case where the add/change button B1 is not operated by the user in step S106 (NO in step S106), meanwhile, the principal controller 50 determines whether or not a predetermined period has elapsed since the add/change button B1 is displayed on the second operation panel 35 (step S113). In the case where the predetermined period has elapsed (YES in step S113), display of the add/change button B1 on the second operation panel 35 is finished (step S114), and the sequence of processes of receiving re-output of a print job is ended.

In the case where the predetermined period has not elapsed (NO in step S113), meanwhile, the process returns to step S106 to continue the process.

Similarly, in the case where the re-output command button B2 is not operated by the user in step S110 (NO in step S110), the principal controller 50 determines whether or not a predetermined period has elapsed since the setting change screen P2 is displayed on the second operation panel 35 (step S115). In the case where the predetermined period has elapsed (YES in step S115), display of the setting change screen P2 on the second operation panel 35 is finished (step S116), and the sequence of processes of receiving re-output of a print job is ended.

In the case where the predetermined period has not elapsed (NO in step S115), meanwhile, the process returns to step S110 to continue the process.

In the present exemplary embodiment, as described above, a re-output command for a print job from the user is received on the second operation panel 35 of the post-processing apparatus 3 in the case where the print job is to be possibly re-output. Consequently, it is not necessary for the user to move to the first operation panel 25 or a PC etc. connected via the communication section 27 in the case where the print job is to be re-output after the user checks the resulting product such as the paper ejected to the ejection section 33 of the post-processing apparatus 3, for example.

Subsequently, a process performed by the job analysis section 51, specifically a process of analyzing whether or not the print job for which an output command has been received corresponds to a print job to be possibly re-output, will be described in detail.

As discussed above, the job analysis section 51 determines, on the basis of the information about the type of the print job and the image formation information, whether or not the print job for which an output command has been received corresponds to a print job to be possibly re-output.

The "print job to be possibly re-output" refers to a print job, after execution of which the image forming processes and the post-processing may be performed again without acquiring the image data again to output a resulting product. As discussed above, when the first output command for a print job is received, the principal controller 50 acquires image data from the image reading section 23 or a PC etc. connected to the communication section 27, and stores such image data in the storage device 50D. In addition, the principal controller 50 stores the image data in the storage device 50D for a predetermined period after execution of the print job, or deletes the image data from the storage device 50D after execution of the print job, in accordance with the type of the print job, the image formation information related to the print job, etc. In the case where the image data stored in the storage device 50D are retained, rather than being deleted, after execution of the print job, the image forming processes and the post-processing may be performed again without acquiring the image data again to output a resulting product.

From the viewpoint of the image data to be used in the image forming processes related to the print job, the print job to be possibly re-output includes a print job in which the image forming processes are performed using a part of the image data. That is, a print job in which the image forming processes are performed using a part of the image data is highly likely to be re-output using the remainder of the image data that was not used in the image forming processes in the first execution of the print job.

Examples of the type of the print job in which the image forming processes are performed using a part of the image data include sample copy for forming, on paper, a sample image for adjusting various conditions for the image formation information using a part of the image data.

In the sample copy, a plurality of sample images in which conditions (such as image density and degree of ground color removal, for example) selected from the image formation information are varied little by little are formed on paper using a part of the image data to be output. After checking the output paper, the user determines the conditions for the image formation information, and re-outputs the print job using all the image data.

Further examples of the type of the print job in which the image forming processes are performed using a part of the image data include test copy for forming an image on paper using a part of the image data for test print.

In the test copy, the image forming processes are executed using a selected part of the image data (e.g. the first page of image data) to output paper. The user checks the output paper, changes the various conditions for the image formation information and the post-processing information as necessary, and re-outputs the print job using all the image data (e.g. the image data for all the pages).

From the viewpoint of the output destinations of the print job, meanwhile, the print job to be possibly re-output includes a print job that has a plurality of output destinations including output to the post-processing apparatus 3 and that is to be output to the post-processing apparatus 3 prior to being output to the other output destinations. That is, such a print job is highly likely to be re-output to the other output destinations after being output via the post-processing apparatus 3.

Examples of the print job that has a plurality of output destinations including output to the post-processing apparatus 3 and that is to be output to the post-processing apparatus 3 prior to being output to the other output destinations include the multiple transmission discussed above.

Other examples of the print job to be possibly re-output include print jobs such as accumulated copy and accumulated print in which the image data are accumulated in the storage device 50D and simple copy and simple print in which a part of the image data (e.g. the image data for the last page) are retained rather than being deleted.

Subsequently, the setting change screen P2 to be displayed on the second operation panel 35 by the display controller 53 will be described. The setting change screen P2 to be displayed on the second operation panel 35 by the display controller 53 differs in accordance with the type of the print job which is a print job to be possibly re-output, for example.

Figure 7:
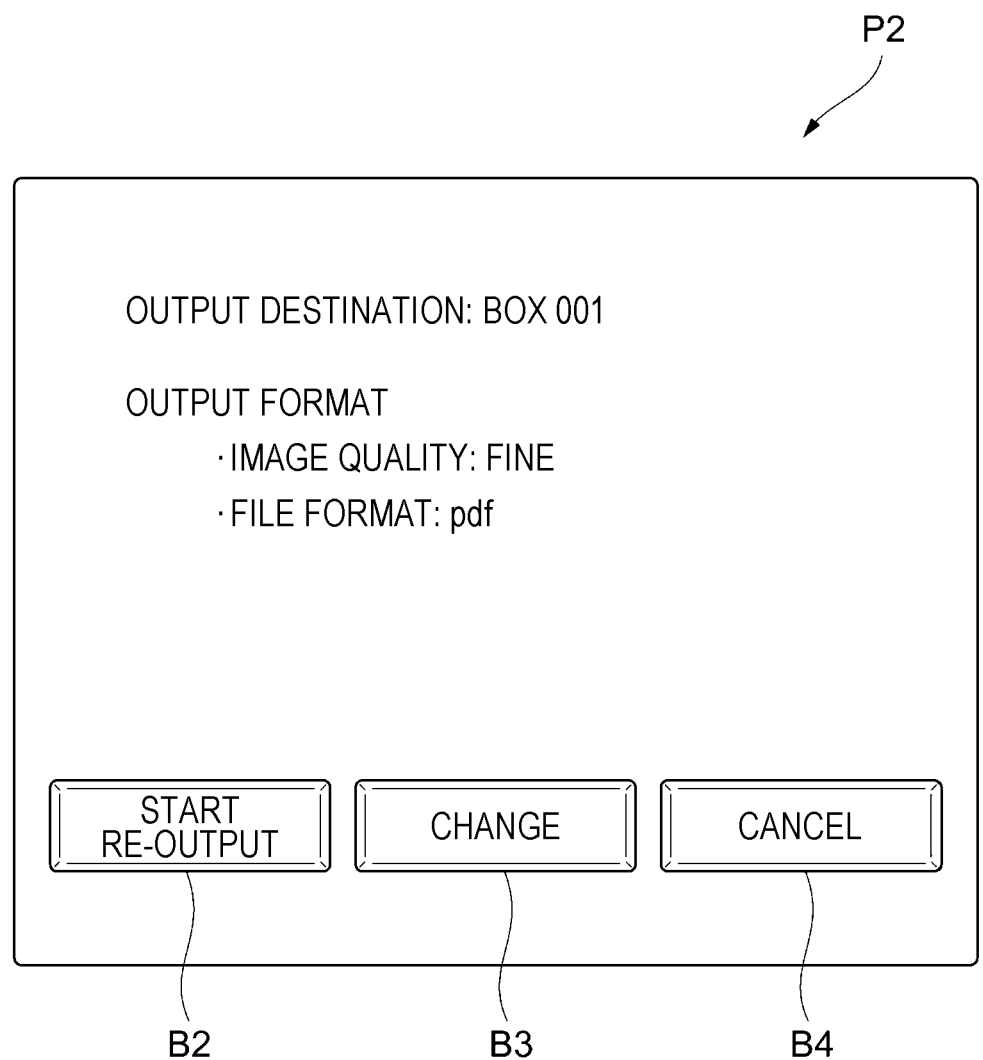
FIG. 7 illustrates a setting change screen to be displayed on the second operation panel in the case where a print job to be possibly re-output is multiple transmission.

FIG. 7 illustrates the setting change screen P2 to be displayed on the second operation panel 35 in the case where the print job to be possibly re-output is multiple transmission.

As illustrated in FIG. 7, the setting change screen P2 which is displayed in the case where the print job to be possibly re-output is multiple transmission receives a command about output to different output destinations other than output to the post-processing apparatus 3 which was made earlier. Specifically, the setting change screen P2 displays an output destination ("box 001" in this example) as the image formation information for output to the different output destinations. The setting change screen P2 also displays information ("image quality" and "file format" in this example) about the output format as the image formation information for output to the different output destinations.

Furthermore, the setting change screen P2 illustrated in FIG. 7 includes the re-output command button B2 for determining the image formation information being displayed and receiving re-output of a print job, a change button B3 for receiving a change of the image formation information being displayed, and a cancel button B4 for receiving cancellation of re-output of a print job.

In the case where the re-output command button B2 is operated by the user, the print job is re-output on the basis of the information about the output destination and the output format being displayed.

In the case where the change button B3 is operated by the user, meanwhile, a change screen for changing the information about the output destination and the output format is displayed on the second operation panel 35. The change screen receives a change of the information about the output destination and the output format.

In the case where the cancel button B4 is operated by the user, further, re-output of the print job to the output destination being displayed is canceled.

In the case where the print job to be possibly re-output is multiple transmission and there are a plurality of different output destinations other than output to the post-processing apparatus 3 which was made earlier, the setting change screen P2 illustrated in FIG. 7 is displayed sequentially for each of the different output destinations. Incidentally, the information about the output destination, the output format, etc. may be changed, and it may be determined whether or not to execute re-output of a print job, for each of the different output destinations for multiple transmission.

While an exemplary embodiment of the present disclosure has been described above, the present disclosure is not limited to the exemplary embodiment discussed above. The exemplary embodiment discussed above may be deformed and combined in various ways without departing from the scope and spirit of the present disclosure.

What is claimed is:

1. An image forming system comprising:
   an image forming apparatus that includes
     an image forming section that forms an image on a recording material in accordance with a print job and
     a first reception section that receives a command about output of the print job; and
   a post-processing apparatus that includes
     a post-processing section that performs post-processing on the recording material transported from the image forming apparatus in accordance with the print job and
     a second reception section that receives a command about the post-processing and that receives a command about re-output of the print job in a case where the print job is to be possibly re-output,
   wherein the second reception section of the post-processing apparatus receives a command about re-output of the print job in a case where the print job is a process of forming an image using a part of image data.

2. The image forming system according to claim 1,
   wherein the second reception section of the post-processing apparatus receives a command about re-output of the print job in a case where the print job is a process of forming an image for checking a condition for the print job using a part of the image data.

3. The image forming system according to claim 2,
wherein the second reception section of the post-processing apparatus receives a command about the condition as the command about re-output of the print job.

4. The image forming system according to claim 1,
wherein the second reception section of the post-processing apparatus receives a command about re-output of the print job in a case where the print job has a plurality of output destinations and is output via the post-processing apparatus prior to being output to the other output destinations.

5. The image forming system according to claim 4,
wherein the second reception section of the post-processing apparatus receives a command about output to the other output destinations as the command about re-output of the print job.

6. The image forming system according to claim 1,
wherein the image forming apparatus includes a storage section that temporarily stores image data related to the print job, and
the second reception section of the post-processing apparatus receives a command about re-output of the print job in a case where at least a part of the image data related to the print job is stored in the storage section.

7. The image forming system according to claim 1,
wherein the second reception section of the post-processing apparatus receives a part of a command about output of the print job received by the first reception section of the image forming apparatus as the command about re-output of the print job.

8. The image forming system according to claim 7,
wherein the image forming apparatus includes an acquisition section that acquires image data related to the print job, and
the second reception section of the post-processing apparatus receives only a command for the image data acquired by the acquisition section as the command about re-output of the print job.

9. An image forming system comprising:
image forming means including
    an image forming section that forms an image on a recording material in accordance with a print job and
    a first reception section that receives a command about output of the print job; and
post-processing means including
    a post-processing section that performs post-processing on the recording material transported from the image forming apparatus in accordance with the print job and
    a second reception section that receives a command about the post-processing and that receives a command about re-output of the print job in a case where the print job is to be possibly re-output, and
wherein the second reception section of the post-processing means receives a command about re-output of the print job in a case where the print job is a process of forming an image using a part of image data.

\* \* \* \* \*